United States Patent [19]

Ogawa et al.

[11] Patent Number: 5,750,233
[45] Date of Patent: May 12, 1998

[54] MAGNETIC RECORDING MEDIUM

[75] Inventors: Hiroshi Ogawa; Tuneo Yoshida; Shinichi Kato, all of Kanagawa, Japan

[73] Assignee: Fuji Photo Film Co., Ltd., Kanagawa, Japan

[21] Appl. No.: 670,667

[22] Filed: Jun. 26, 1996

[30] Foreign Application Priority Data

Jul. 20, 1995 [JP] Japan .................. 7-205125

[51] Int. Cl.$^6$ .................. G11B 5/708
[52] U.S. Cl. .................. 428/141; 428/215; 428/323; 428/328; 428/336; 428/425.9; 428/522; 428/694 BN; 428/694 BR; 428/694 BG; 428/694 BC; 428/900
[58] Field of Search .................. 428/323, 694 BN, 428/900, 141, 694 BR, 328, 425.9, 522, 694 BG, 336, 694 BC, 215

[56] References Cited

U.S. PATENT DOCUMENTS

| | | | |
|---|---|---|---|
| 4,801,505 | 1/1989 | Ejiri et al. | 428/404 |
| 5,035,948 | 7/1991 | Saito et al. | 428/329 |
| 5,456,977 | 10/1995 | Ejiri et al. | 428/328 |
| 5,503,922 | 4/1996 | Shimasaki et al. | 428/323 |

*Primary Examiner*—Stevan A. Resan
*Attorney, Agent, or Firm*—Sughrue, Mion, Zinn, Macpeak & Seas, PLLC

[57] ABSTRACT

A magnetic recording medium is disclosed, comprising a non-magnetic support having thereon a magnetic layer containing a ferromagnetic metal power and a binder resin as a main component and an abrasive as a sub-component, wherein the ferromagnetic metal powder contains iron as a main component and aluminum in an amount of from 1 to 25 atm % based on the Fe atom, the magnetic layer contains abrasive particles having a Moh's hardness of 6 or more in an amount of from 4 to 18 parts by weight per 100 parts by weight of the ferromagnetic metal powder, and the abrasives exposure unit having a size of 0.3 μm or more observed through an electron microscope on the magnetic layer surface is 3.5 pieces/100 μm$^2$ or less.

29 Claims, No Drawings

MAGNETIC RECORDING MEDIUM

FIELD OF THE INVENTION

The present invention relates to a magnetic recording medium having excellent electromagnetic property and running durability, and reduced in the head abrasion.

BACKGROUND OF THE INVENTION

To cope with the trend in recent years toward high density recording, the magnetic recording medium is being required to have a high electromagnetic property and at the same time, running durability capable of severe uses under various environmental conditions.

The running durability is related to still durability, head clogging and reduction in output, and in order to improve these properties, it is known that the abrasive plays a particularly important role. Accordingly, the amount of abrasives present on the magnetic layer surface has been conventionally controlled. This method is described in JP-A-61-57036 (the term "JP-A" as used herein means an "unexamined published Japanese patent application") and JP-A64-88917.

JP-A-61-57036 discloses a magnetic recording medium improved in the abrasive force against the magnetic head by specifying the number of abrasive particles on the magnetic layer (surface) to 0.25 pieces/100 μm and JP-A-64-88917 discloses a magnetic recording medium improved in the abrasive force against the magnetic head by specifying the number of alumina as an abrasive on the magnetic layer (surface) to from 0.25 to 0.60 pieces/100 μm$^2$.

These methods for controlling the amount of abrasives on the surface of magnetic layer have succeeded in keeping a balance between reciprocal properties of head clogging and head abrasion in a system where the recording density is not high such that the relative speed to the head is less than 6 m/s.

However, in the recent systems where the recording density is further increased, for example, β cum SP or D2 system of VTR for business use, the relative speed of the tape to the head exceeds 6 m/s. In such a high density recording system, particularly in the magnetic recording medium using ferromagnetic metal powder, conventional methods can difficultly keep the balance of properties between the head clogging and the head abrasion. More specifically, the same addition amount of abrasives as conventional causes too large head abrasion and the life of head is shortened, on the other hand, when the addition amount is reduced, head clogging is readily generated.

As a result of extensive investigations, the present inventors have taken notice of the size of abrasive particles on the magnetic layer surface.

SUMMARY OF THE INVENTION

The object of the present invention is to provide a magnetic recording medium having high output and reduced in the head clogging and head abrasion.

The object of the present invention can be attained by a magnetic recording medium comprising a non-magnetic support having thereon a magnetic layer containing a ferromagnetic metal powder and a binder resin as a main component and an abrasive as a subs-component, wherein the ferromagnetic metal powder contains iron as a main component and aluminum in an amount of from 1 to 25 atm % based on the Fe atom, the magnetic layer contains abrasive particles having a Moh's hardness of 6 or more in an amount of from 4 to 18 parts by weight per 100 parts by weight of the ferromagnetic metal powder, and the abrasives exposure unit having a size of 0.3 μm or more observed through an electron microscope on the magnetic layer surface is 3.5 pieces/100 μm$^2$ or Less.

DETAILED DESCRIPTION OF THE PRESENT INVENTION

The magnetic recording medium can exhibit good electromagnetic property, running durability and head abrasion property, which is considered to result from the following reasons:

The ferromagnetic metal powder used in the magnetic layer contains iron as a main component and aluminum in an amount of from 1 to 25 atm % based on the Fe atom and the abrasive for use in the magnetic layer has a Moh's hardness of 6 or more and is used in an amount of from 4 to 18 parts by weight per 100 parts by weight of the ferromagnetic metal power, whereby mainly running property and durability are improved. Further, the abrasives exposure unit having a size of 0.3 μm or more observed through an electron microscope on the magnetic layer surface is controlled to be 3.5 pieces/100 μm$^2$ or less, which contributes mainly to the reduction in head abrasion. As an overall effect of these elements specified as above, the electromagnetic property is also improved.

For obtaining good running property and durability, the addition amount of abrasives used in the present invention is preferably from 4 to 16 parts by weight, more preferably from 4 to 12 parts by weight, per 100 parts by weight of the ferromagnetic metal powder. If the addition amount is less than 4 parts by weight, head clogging resistance cannot be improved, whereas if it exceeds 16 parts by weight, Br in the magnetic layer is reduced to disadvantageously lower the output.

The term "abrasives exposure unit" as used in the present invention means a lump portion comprising primary or secondary particles of abrasive particles appearing above the magnetic layer surface upon observation of the magnetic layer surface through a scanning electron microscope (usually observed on a photograph). The lump may contain a binder. The primary particle comprises one abrasive particle and the secondary particle comprises a plurality of particles aggregated and coagulated. The size of abrasives exposure unit indicates the maximum length of the region clearly discriminated from the flat portion of the magnetic layer due to difference in the wavelength of secondary electron beams. The number of the abrasives exposure unit per 100 μm$^2$ is an average of five different sites on the magnetic layer surface.

The magnetic recording medium of the present invention is characterized in that the issues of head abrasion and running durability are improved by limiting the number of abrasives in the magnetic layer coming out on the magnetic layer surface. As a result of investigations, the present inventors have found that the abrasives exposure unit having a size of 0.3 μm or more present on the magnetic layer surface is suitably 3.5 pieces/100 μm$^2$ or less, preferably 2.5 pieces/100 μm$^2$ or less, more preferably 2.0 pieces/100 μm$^2$ or less and based on this finding, they have accomplished the present invention.

In a system having a large relative speed to the head, it may be a natural result that air film is formed between the head and the tape and the head is difficultly abraded. However, when the size of the abrasives exposure unit exceeds 0.3 μm, the projection from the magnetic layer surface becomes excessive, which is considered to abrade the head surface.

In the present invention, the method of controlling the size and density of the abrasives exposure unit to a predetermined value is not particularly restricted, but specific examples thereof include the following methods:

(1) to select the particle size and shape of abrasives to be used;

(2) to select the composition of the magnetic coating solution and the addition means and addition time of abrasives in the preparation of the magnetic coating solution; and (3) to use methods (1) and (2) in combination.

Method (2) comprises formation of a paste by dispersing abrasives, binder resin and an organic solvent, and filtration of the dispersion solution.

The binder resin, the organic solvent and the dispersion means may be appropriately selected from those described later for the magnetic layer. The dispersion conditions are such that sand grinder is used and the dispersion time is preferably from 2 to 24 hours. The filtration treatment comprises filtration of coarse particles through a filter having an average hole size of 3 µm or less, preferably 1 µm or less.

After coating abrasives uniformly dispersed in the magnetic coating solution until the solution is dried, the distribution of abrasives in the magnetic layer is determined. The distribution varies depending upon affinity of the solvent in the coating solution for abrasives, affinity of abrasives with each other, difference in the affinity, or the drying speed. Further, the abrasive distribution after coating of the magnetic coating solution may vary by changing the addition time of abrasives to the magnetic coating solution. Accordingly, selection of the kind of these organic solvent and abrasive and selection of the addition time are useful mainly in controlling the density of the abrasives exposure unit.

Method (1) is described. The particle size of abrasives is important mainly in controlling the size of the abrasives exposure unit and it is preferably from 0.05 to 0.3 µm, more preferably from 0.1 to 0.3 µm.

In the case of combination use of methods (1) and (2), the average particle size determined through a scanning electron microscope after dispersion is preferably from 0.05 to 0.3 µm, more preferably from 0.1 to 0.3 µm. If it is less than 0.05 µm, the abrasion effect is reduced, therefore, the addition amount must be increased in some cases, however, even if a large amount of additives are added, the head clogging may not be reduced as expected or the flux density of the magnetic layer is lowered to reduce the output.

If the average particle size exceeds 0.3 µm, the head abrasion increases to cause difficulty in keeping the balance with the head clogging.

Examples of the raw material of abrasives for use in the present invention include well-known materials such as α-alumina having an α-conversion rate of from 90 to 100%, β-alumina, γ-alumina, silicon carbide, chromium oxide, cerium oxide, α-iron oxide, corundum, artificial diamond, silicon nitride, titanium carbide, titanium oxide, silicon dioxide and boron nitride, and these materials may be used individually or in combination. A composite of these abrasives (an abrasive surface-treated with other abrasive) may also be used. The abrasive may contain compounds or elements other than the main components and if the main component accounts for 90% or more, the same effect can be provided.

The tap density (measured under the condition of number of tapping: 150 and head: 30 mm) of the abrasive is from 0.3 to 2 g/ml, the water content is from 0.1 to 5%, the pH is from 2 to 11 and the shape may be any of acicular, spherical and die forms.

Specific examples of the abrasive for use in the present invention include AKP-20, AKP-30, AKP-50, HIT-50 (all produced by Sumitomo Chemical Co., Ltd.), G5, G7, S-1 (all produced by Nippon Kagaku Kogyo KK), 100ED and 140ED (produced by Toda Kogyo KK).

The ferromagnetic metal powder for use in the present invention contains Fe as a main component. The term "main component" as used herein means a component accounting, in terms of the constitution ratio of an alloy, for 50 wt % or more.

The ferromagnetic metal powder also contains aluminum in an amount of from 1 to 25 atm %, preferably from 1 to 20 atm %, more preferably from 1 to 10 atm % based on the Fe atom. The aluminum is usually used as a surface treating agent of the ferromagnetic metal powder and has a function of improving durability, storability and abrasion resistance. If the Al content is less than 1.0 atm %, the head clogging is readily generated and a large amount of abrasives must be added to improve the durability. As a result, the head abrasion is disadvantageously liable to increase. On the other hand, if it exceeds 25 atm %, the occupation ratio of non-magnetic elements in the ferromagnetic metal powder increases too much and the magnetic force of the magnetic metal powder is diminished to disadvantageously reduce the electromagnetic property (e.g., output). Other than the above-described elements, in order to improve and control magnetization or magnetic force resistance and other than the magnetic element such as Co and Ni, in order to improve dispersibility and durability, the ferromagnetic metal powder may contain elements such as Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Sr and B. The ferromagnetic metal powder may also contain a slight amount of hydroxide or oxide. Further, the ferromagnetic metal powder preferably has an oxide film on the surface thereof in view of prevention of oxidation and demagnetization thereof.

The ratio of the major axis (i.e., the length in the long axis) to the minor axis (i.e., the length in the short axis), namely, acicular ratio of the ferromagnetic metal powder for use in the present invention is preferably from 2 to 20 (more preferably from 2 to 10). The major axis as used herein indicates the longest axis in three axes of a particle and the minor axis indicates the shortest axis.

The average major axis length of the ferromagnetic metal powder is preferably from 0.01 to 0.5 µm, more preferably from 0.02 to 0.4 µm. If it is less than 0.01 µm, the saturation magnetization ($\sigma_s$) becomes small or orientation of the ferromagnetic metal powder becomes insufficient, as a result, the residual magnethic flux density (Br) is reduced to fail in achieving satisfactory output and to occur the head clogging since head abrasion resistance is decreased. On the other hand, if the average major axis length exceeds 0.5 µm, smoothness of the magnetic layer surface is lowered to cause difficulty in achieving satisfactory output or noise increases to disadvantageously lower S/N or C/N.

The magnetic recording medium of the present invention may have any constitution if a magnetic layer is formed on a non-magnetic support, however, the magnetic layer having the above-described constitution is preferably provided as an uppermost layer. Between the non-magnetic support and the magnetic layer, a non-magnetic layer or a lower magnetic layer may be provided. Examples of the magnetic powder which can be used in the lower magnetic layer include, in addition to the ferromagnetic metal powder, well-known magnetic powders such as iron oxide, Co-containing iron oxide and barium ferrite. The Hc of the lower magnetic layer is preferably low. Examples of the non-magnetic particle used when a non-magnetic layer is provided, include well-known non-magnetic inorganic particles such as a iron oxide, titanium oxide, zinc oxide, alumina, chromium oxide, glass powder and carbon, and well-known resin powders such as melamine resin powder, benzoguanamine resin powder, hardened polystyrene powder and acrylic resin powder.

The magnetic powder for use in the present invention has a specific surface area determined by the BET method of generally from 30 to 100 m$^2$/g, preferably from 40 to 80 m$^2$/g.

The magnetic powder of the present invention has a crystallite size of generally from 50 to 450 Å, preferably from 80 to 350 Å.

The magnetic powder of the present invention has an Hc of generally from 1,000 to 3,000 Oe, preferably from 1,400 to 2,500 Oe.

The magnetic powder for use in the present invention has a $\sigma_s$ of 90 emu/g or more, preferably 100 emu/g or more.

The pH of the magnetic substance is preferably optimized according to the combination with the binder used, and the pH is generally from 4 to 12, preferably from 7 to 10.

The magnetic powder for use in the present invention preferably has a smaller number of vacancies and the value thereof is generally 20% by volume or less, preferably 5% by volume or less.

The ferromagnetic metal powder as a typical example of the ferromagnetic powder to be used in the present invention can be prepared by these known methods.

Examples of the method for preparing the ferromagnetic metal powder include the following methods:

(a) Method which comprises the reduction of a composite organic acid salt (mainly oxalate) with a reducing gas such as hydrogen;

(b) Method which comprises the reduction of iron oxide with a reducing gas such as hydrogen to obtain Fe or Fe—Co particles;

(c) Method which comprises the thermal decomposition of a metal carbonyl compound;

(d) Method which comprises the reduction of an aqueous solution of ferromagnetic metal with a reducing agent such as sodium borohydride, hydrophosphite and hydrazine; and (e) Method which comprises the evaporation of a metal in a low pressure inert gas to obtain a finely divided metal powder.

The ferromagnetic metal powder thus obtained may be subjected to a known gradual oxidation treatment such as a process which comprises dipping the ferromagnetic metal powder into an organic solvent and then drying the material, a process which comprises dipping the ferromagnetic metal powder into an organic solvent with an oxygen-containing gas bubbled thereinto to form an oxide film on the surface of the ferromagnetic metal powder and then drying the material, and a process which comprises controlling the partial pressure of oxygen gas and inert gas instead of using an organic solvent to form an oxide film on the surface of the ferromagnetic metal powder.

The magnetic layer of the present invention can contain ferromagnetic metal powders, abrasives, and binder resins and further solid or liquid lubricants and if necessary carbon black.

The binder resin which can be used in a single magnetic layer or a upper or lower magnetic layer of plural magnetic layers in the magnetic recording medium of the present invention, include: known thermoplastic resins, thermosetting resins, reactive resins or mixtures thereof. Thermoplastic resins include those having a glass transition temperature of −100° C. to 150° C., a number-average molecular weight of 1,000 to 200,000, preferably 10,000 to 100,000, and a polymerization degree of about 50 to 1,000. Example of such thermoplastic resins include: polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Example of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, a mixture of polyester polyol and polyisocyanate, and a mixture of polyurethane and polyisocyanate.

These resins are further described in "Plastic Handbook", Asakura Shoten.

Further, known electron radiation curing resins can be incorporated into either the upper (magnetic) layer or the lower (magnetic) layer. Examples of these resins and their preparation methods are further described in JP-A-62-256219.

These resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane, polycaprolactone polyurethane and polyolefin polyurethane.

Of all these binders, those in which at least one polar group selected from —COOM, —SO$_3$M, —OSO$_3$M, —P=O(OM)$_2$, —O— P=O(OM)$_2$, (in which M represents a hydrogen atom or alkali metal atom), —OH, NR$^2$, —N$^+$R$^3$ (in which R is a hydrocarbon group), epoxy group, —SH and —CN has been introduced by copolymerization or addition reaction may be optionally used to obtain better dispersibility and durability.

The amount of such the polar group is in the range of generally 1×10$^{-1}$ to 1×10$^{-8}$ mole/g, preferably 1×10$^{-2}$ to 1×10$^{-6}$ mole/g.

Specific examples of these binders to be used in the present invention include VAGH, VYHH, VMCH, VAGF, VAGD, VROH, VYES, VYNC, VMCC, XYHL, XYSG, PKHH, PKHJ, PKHC, and PKFE (produced by Union Carbide); MPR-TA, MPR-TA5, MPR-TAL, MPR-TSN, MPR-TMF, MPR-TS, MPR-TM and MPR-TAO (produced by Nisshin Chemical Industries, Co., Ltd.); 1000W, DX80, DX81, DX82, DX83 and 100FD (produced by The Electro Chemical Industrial Co., Ltd.); MR-104, MR-105, MR110, MR100, and 400X-110A (produced by Japanese Zeon Co., Ltd.); Nippollan N2301, N2302 and N2304 (produced by Nippon Polyurethane Co., Ltd.); Pandex T-5105, T-R3080, T-5201, Burnock D-400, D-210-80, Crisvon 6109 and Crisvon 7209 (produced by Dainippon Ink And Chemicals, Inc.); Vylon UR8200, UR8300, UR8600, UR5500, UR4300, RV530, RV280 and FB84 (produced by Toyobo Co., Ltd.); Daipheramine 4020, 5020, 5100, 5300, 9020, 9022, and 7020 produced by Dainichiseika Co., Ltd.); MX5004 (produce by Mitsubishi Chemical Corporation); and Sunprene SP-150, TIM-3003 and TIM-3005 (produced by Sanyo Chemical Industries Co., Ltd.), and Salan F310 and F210 (produced by Asahi Chemical Industry Co., Ltd.).

The binder resins (including a hardening agent) are used in an amount of generally 5 to 50% by weight, preferably 10 to 30% by weight based on the magnetic powder of each of single magnetic layer or upper magnetic layer and lower magnetic layer in plural magnetic layers.

When a vinyl chloride resin is used, the amount of the vinyl chloride resin is preferably 5 to 30% by weight based on the magnetic powder.

When a polyurethane resin is used, the polyurethane resin is used in an amount of 2 to 20% by weight and polyisocyanate is used in an amount of 2 to 20% by weight.

In the present invention, when polyurethane is used, its glass transition temperature, breaking extension, breaking stress and yield point are preferably in the range of $-50°$ C. to $100°$ C., 100 to 2,000%, 0.05 to 10 $kg/cm^2$ and 0.05 to 10 $kg/cm^2$, respectively.

The magnetic recording medium of the present invention may consist of two layers. Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered from the upper magnetic layer to the lower magnetic layer as is necessary, according to a well-known technique regarding the plural magnetic layers.

For example, when the amount of binder is changed between the upper magnetic layer and lower magnetic layer, it is effective that the amount of binder in the upper magnetic layer is increased to reduce wear of the magnetic layer surface, and the amount of binder in the non-magnetic layer other than the upper magnetic layer or lower magnetic layer is increased to obtain flexibility and thereby the improved head touch against magnetic head.

Examples of polyisocyanates which can be used in the present invention include isocyanates such as tolylenediisocyanate, 4,4'-diphenylmethanediisocyanate, hexamethylenediisocyanate, xylylenediisocyanate, naphthalene-1,5diisocyanate, o-toluidiisocyanate, isophoronediisocyanate and triphenylmethanetriisocyanate, reaction products of these isocyanates with a polyalcohol, and polyisocyanates produced by the condensation of isocyanates. Examples of the trade name of these commercially available isocyanates include Coronate L, Coronate HL, Coronate 2030, Coronate 2031, Millionate MR, and Millionate MTL (produced by Nippon Polyurethane Co., Ltd.); Takenate D-102, Takenate D-110N, Takenate D-200, and Takenate D-202 (produced by Takeda Chemical Industries, Ltd.); and Desmodur L, Desmodur IL, Desmodur N, and Desmodur HL (produced by Sumitomo Bayer Co., Ltd.). These isocyanates can be used singly. Two or more of these isocyanates can be used so that the difference in hardening reactivity between them can be utilized.

The carbon black can be added to the magnetic layer of the present invention for inhibiting the electrification and as a solid-lubricant.

The carbon black to be incorporated into the magnetic layer of the present invention can be furnace black for rubber, thermal black for rubber, black for color, acetylene black, etc. Such the carbon black preferably has a specific surface area of 5 to 500 $m^2/g$, DBP oil adsorption of 10 to 400 ml/100 g, average grain diameter of 5 mµ to 300µ, pH value of 2 to 10, water content of 0.1 to 10%, and tap density of 0.1 to 1 g/ml. Specific examples of carbon black to be used in the present invention include BLACKPEARLS 2000, 1300, 1000, 900, 800, 700 and VULCAN XC-72 produced by Cabot Co., Ltd.; #80, #60, #55, #50, and #35 produced by Asahi Carbon Co., Ltd.; #2400B, #2300, #900, #1000, #30, #40, and #10B produced by Mitsubishi Chemical Corporation; CONDUTEX SC and RAVEN 150, 50, 40 and 15 produced by Columbia Carbon Co., Ltd. These carbon blacks may be surface-treated with a dispersant, grafted with a resin or partially graphitized before use. These carbon blacks may be previously dispersed in a binder before being added to the magnetic coating solution. These carbon blacks may be used singly or in combination. If carbon black is to be used, its content is preferably in the range of 0.1 to 30% based on the weight of ferromagnetic powder. Carbon black serves to inhibit the electrification of the magnetic layer, reduce the frictional coefficient, provide light screening effect, enhance the film strength, etc. These functions vary with the kind of carbon black used. These carbon blacks may be different in kind, content and combination from the lower layer to the upper layer depending on the previously specified properties such as grain size, oil adsorption, electrical conductivity and pH. For carbon blacks which can be used in the magnetic layer of the present invention, reference can be made to "Handbook of Carbon Black", Carbon Black Kyokai.

The additives to be used in the present invention can be those having a lubricating effect, an antistatic effect, a dispersing effect, a plasticizing effect, etc. For example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, ester alkylsulfate and alkaline metal salt thereof, polyphenyl ether, fluorine-containing ester alkylsulfate and alkaline metal salt thereof, monoaliphatic ester, dialiphatic ester or trialiphatic ester of monobasic aliphatic acid with 10 to 24 carbon atoms (which may contain an unsaturated bond or may be branched) and salt thereof with metals (e.g., Li, Na, K, Cu), monovalent, divalent, trivalent, tetravalent, pentavalent and hexavalent alcohol with 12 to 22 carbon atoms (which may contain an unsaturated bond or may be branched), alkoxy alcohol with 12 to 22 carbon atoms or monobasic aliphatic acid with 10 to 24 carbon atoms (which may contain an unsaturated bond or may be branched) with one of monovalent, divalent, trivalent, tetravalent, pentavalent and hexavalent alcohols with 2 to 12 carbon atoms (which may contain an unsaturated bond or may be branched), aliphatic ester of monoalkyl ester of alkylene oxide polymer, aliphatic amide with 8 to 22 carbon atoms, aliphatic amine with 8 to 22 carbon atoms, etc., can be used. Specific examples of such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, nonionic surface active agent such as alkylene oxide, glycerin, glycidol and alkylphenolethylene oxide addition product, cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, ester sulfate and ester phosphate; amphoteric surface active agents such as amino acid, aminosulfonic acid, sulfuric or phosphoric ester of amino alcohol and alkylbetaine, etc., can be used. These surface active agents are further described in "Kaimen Kasseizai Binran (Handbook of Surface Active Agents)", Sangyo Tosho K. K. These lubricants, antistatic agents, etc., need not be necessarily 100% pure, but may contain impurities such as isomer, unreacted material, by-product, decomposition product and oxide. The concentration of these impurities is preferably in the range of 30% or less, more preferably 10% or less.

Examples of organic solvents which can be used in the present invention include: ketones, such as acetone, methyl ethyl ketone, methyl isobutyl ketone, diisobutyl ketone, cyclohexanone, isophorone and tetrahydrofuran; alcohols, such as methanol, ethanol, propanol, butanol, isobutyl alcohol, isopropyl alcohol and methyl cyclohexanol; esters such as methyl acetate, butyl acetate, isobutyl acetate, isobutyl acetate, isopropyl acetate, ethyl butyrate and glycol acetate; glycol ethers, such as glycol dimethyl ether, glycol monoethyl ether and dioxane; aromatic hydrocarbons such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide, and hexane. These organic solvents may be used in any proportion. These organic solvents are not necessarily 100% pure and may contain impurities such as isomers, unreacted matters, side reaction products, decomposition products, oxides and water content besides main components. The content of these impurities is preferably in the range of 0 to 30%, more preferably 0 to 10%.

In the thickness configuration of the magnetic recording medium of the present invention, the thickness of the nonmagnetic support is in the range of generally 1 to 100 µm, preferably 6 to 20 µm, the thickness of the magnetic layer is in the range of generally 0.05 to 10 µm, preferably 0.1 to 5 µm, and if the magnetic layer is plural layers, the lower magnetic layer has a thickness of preferably 5 µm or less, particularly preferably 4 µm or less.

Also, an undercoating layer may be provided between the nonmagnetic layer and the lower magnetic layer to enhance the adhesion therebetween, and an interlayers containing carbon black may be provided for inhibiting the electrification. The thickness of these layers is generally 0.01 to 2 µm, preferably 0.05 to 0.5 µm. A back coating layer may be provided on the other side of the nonmagnetic support. The thickness of the back coating layer is in the range of generally 0.1 to 2 µm, preferably 0.3 to 1.0 µm. For these undercoating and back coating layers, one can use known materials.

The nonmagnetic support to be used in the present invention can be any known film such as polyester, e.g., polyethylene terephthalate (PET) and polyethylene naphthalate; polyolefin, cellulose triacetate, polycarbonate, polyamide, polyimide, polyamide imide and polysulfon. These support (materials) may be previously subjected to corona discharge, plasma treatment, easy adhesion treatment, heat treatment, dust removing treatment, etc. In order to accomplish the objects of the present invention, it is necessary to use a nonmagnetic support having a center-line average surface roughness of 0.03 µm or less, preferably 0.02 µm or less, more preferably 0.01 µm or less. Such a nonmagnetic support preferably not only has a small average surface roughness on the center line, but also has no big protrusions having a size of 0.5 µm or more. The shape of the surface roughness may be freely controlled by the size and amount of filler to be incorporated into the support as is necessary. Examples of the filler include oxide and carbonate of Ca, Si, and Ti, and finely divided powder of organic material such as acryl.

The nonmagnetic support to be used in the present invention preferably exhibits F-5 (i.e., the load at the 5% elongation) values of 5 to 50 kg/mm$^2$ in the tape running direction and 3 to 30 kg/mm$^2$ in the tape width direction. In general, F-5 value in the tape lengthwise (tape running) direction is higher than F-5 value in the tape width direction. However, if the crosswise (tape width) strength of the nonmagnetic support needs to be high, the present invention is not limited to this specification.

The breaking strength of the nonmagnetic support is preferably in the range of 5 to 100 kg/mm$^2$ in both direction. The elastic modulus of the support is preferably in the range of 100 to 2000 kg/mm$^2$ in both directions.

The process for the preparation of the magnetic coating solution for the magnetic layer in the magnetic recording medium of the present invention comprises at least a kneading step, a dispersion step, and a mixing step which is optionally provided before or after these steps.

In order to accomplish the objects of the present invention, a known preparation technique can, of course, be used as a step. In the kneading step, an apparatus having a strong kneading power such as continuous kneader and pressure kneader can be used.

The details of these kneading techniques are described in JP-A-1-106388 and JP-A-64-79274.

When the magnetic recording medium of the present invention has plural magnetic layers, the thickness of the upper magnetic layer is preferably 1.0 µm or less. In order to providing the magnetic layer having the above thickness, the conventional lower layer is coated and dried and then the upper layer is coated thereon by a simultaneous multi-layer coating method as disclosed in JP-A-62-212933 since the successive multi-layer coating method occurs a coating defect which is not substantially practical.

In order to obtain a magnetic recording medium according to the present invention, a strong orientation needs to be effected. A solenoid having 1,000 g (Gauss) or more and a cobalt magnet having 2,000 G or more are preferably used in combination. Further, a proper drying process is preferably provided before the orientation step to maximize the orientability after drying. If the present invention is applies to disc medium, an orientation method for randomizing orientation is needed.

When the magnetic layer of the present invention is plurality, the orientation direction may be changed to for example, a perpendicular direction or a width direction in addition to a face direction.

After orientation, the magnetic layer of the present invention can be calendering-processed.

As calendering roller roll, there can be used a roll made of a heat-resistant plastic such as epoxy, polyimide, polyamide and polyimidamide or metals. The processing temperature is preferably in the range of 70° C. to 150° C., more preferably 80° C. to 150° C. The linear pressure is preferably in the range of 200 to 500 kg/cm, more preferably 300 to 400 kg/cm.

After calendering-process, thermo-treatment may be carried out at 40° to 80° C. for 6 to 120 hours.

Further, after the thermo-treatment, the magnetic layer surface may be blade-treated with a sapphire-blade.

EXAMPLE

The present invention is described in greater detail below with reference to Examples and Comparative Examples. In the Examples, the "part" means "part by weight".

Preparation of alumina paste

| | |
|---|---|
| α Alumina (HIT-60A produced by Sumitomo Chemical Co., Ltd.: average particle size: 0.18 μm) | 100 parts |
| Vinyl chloride resin (MR110, produced by Japanese Zeon Co., Ltd.) | 5 parts |
| MEK/cyclohexanone = 6/4 mixed solvent | 95 parts |

The above-described mixture was placed in a sand grinder containing alumina-made vessel beads and dispersed for 3 hours. The resulting dispersion solution was designated as Paste A. Further, the dispersion solution obtained after dispersion for 6 hours was designated as Paste B. Furthermore, the dispersion solution obtained by filtering Paste B though a filter having an average hole size of 1 μm was designated as Paste C.

Paste D was prepared in the same manner as above except that HIT-55 (average particle size: 0.23 μm) was used in place of HIT-60A and dispersion was performed for 6 hours.

Paste E was prepared in the same manner as above except that AKP-20 (average particle size: 0.51 μm) was used in place of HIT-55 and dispersion was performed for 6 hours.

Mixtures A, B and C were dispersed in a ball mill for 48 hours and the dispersion solution obtained was designated as Paste F.

The specification of Pastes A to F is shown in Table 1.

TABLE 1

Contents of Abrasive Paste

| Paste | Alumina | Disperser | Dispersion Time | Filtration |
|---|---|---|---|---|
| A | HIT-60A | sand grinder | 3 hr | none |
| B | HIT-60A | sand grinder | 6 hr | none |
| C | HIT-60A | sand grinder | 6 hr | done |
| D | HIT-55 | sand grinder | 6 hr | none |
| E | AKP-20 | sand grinder | 6 hr | none |
| F | HIT-60A | ball mill | 48 hr | none |

Preparation of magnetic coating solution

Composition (1)

A mixture of:

| | |
|---|---|
| Ferromagnetic powder (Hc: 1,600 Oe, average major axis length: 0.3 μm, crystallite size: 150 Å, $\sigma_s$: 125 emu/g, BET: 58 m$^2$/g, Al content: 5 atm %) | 100 parts |
| Vinyl chloride copolymer (MR110, produced by Japanese Zeon Co., Ltd.) | 8 parts |
| Polyurethane resin (UR8600, produced by Toyobo KK) | 5 parts |
| MEK | 8 parts |
| Cyclohexanone | 40 parts |

Composition (2)

| Abrasive | kind and addition amount are shown in Table 2 |
|---|---|
| Carbon black (#50, produced by Asahi Carbon KK) | 1 part |
| Polyurethane resin (UR8600, produced by Toyobo KK) | 3 parts |
| MEK | 200 parts |

Composition (3)

| | |
|---|---|
| Polyisocyanate (C3040, produced by Nippon Polyurethane Co., Ltd.) | 4 parts |
| Stearic acid dibutylamide (industrial grade) | 0.5 part |
| 2-Ethylhexyl stearate (industrial grade) | 0.5 part |
| Stearic acid (industrial grade) | 1 part |
| MEK | 20 parts |

Back Layer Composition

| | |
|---|---|
| Carbon black (BP800, produced by Cabot) | 100 parts |
| Alumina (HIT100, produced by Sumitomo Chemical Co., Ltd.) | 0.3 part |
| Barium sulfate (BF1, produced by Sakai Kagaku KK) | 0.1 part |
| Copper oleate (industrial grade) | 0.1 part |
| Stearic acid dibutylamide (industrial grade) | 0.7 part |
| 2-Ethylhexyl myristate (industrial grade) | 0.7 part |
| Nitrocellulose (HIG1/2, produced by Asahi Chemical Industry Co., Ltd.) | 20 parts |
| Polyurethane resin (N2301, produced by Nippon Polyurethane Co., Ltd.) | 25 parts |
| Polyisocyanate (C3040, produced by Nippon Polyurethane Co., Ltd.) | 15 parts |
| MEK | 1,000 parts |

Composition (1) was placed in a kneader and well kneaded. Composition (2) was added thereto and mixed, the mixture was dispersed in a sand grinder. Composition (3) was added and mixed, the viscosity of the mixture was adjusted with MEK and the mixture was filtered through a filter having an average hole size of 1 μm to prepare a magnetic coating solution.

The thus-prepared magnetic coating solution was coated on a 10 μm-thick PET support to have a dry thickness of 3.5 μm, the magnetic powder was oriented by a magnet, the solvent was dried, and then a back solution obtained by dispersing and filtering the above-described back layer composition was coated on the surface of the support opposite to the surface whereon magnetic layers were provided in sequence, to have a dry thickness of 0.5 μm and dried, thereby obtaining a bulk roll. The roll obtained was calendered at 100° C. through 7 stages, subjected to thermo-treatment at 60° C. for 48 hours, and slit into a ½ inch width to obtain a pancake. The pancake obtained was blade-treated with a sapphire blade and 670 m of the pancake was integrated into an L cassette with β cum SP to obtain a video tape.

A video tape was obtained in the same manner as above except for using an Al-free alloy powder or an alloy powder containing 5 atm % of Si in place of the ferromagnetic metal powder containing Al in Composition (1). The tapes obtained were designated as C8 and C9 (C means a comparative example, otherwise, examples of the present invention).

Each sample obtained above was evaluated with respect to the following items and the results are shown in Table 2.

Density of Abrasives Exposure Unit

A photograph of the magnetic layer surface was taken at a magnification of 100,000 by means of a scanning electron microscope and the number of units having a size of 0.3 μm or more present in the area of 100 μm$^2$ was measured.

RF Output

A projected image signal of Projected Image Signal 50IRE was recorded at a standard recording current. An average of envelopes of the reproduction RF output was measured by an oscilloscope and the RF output was calculated according to the following formula:

$$\text{RF Output (dB)} = 20 \text{Log}_{10} V/V_0$$

(wherein V is an average value and $V_0$ is a standard value).

Head Clogging

While continuously running 30 rolls of virgin cassettes at 0° C., output and DO were measured. The clogging was evaluated by the presence or absence of DO or reduction in output of from 500 µs or more or 10 dB or more.

Head Abrasion

Virgin cassettes were continuously subjected to one time recording at 25° C. and 50% RH and one time reproduction and the head abrasion (reduction in height of the head) per 100 hours was determined.

Overall Judgment

Judgment was given based on the lowest evaluation.

| Judgement: | x | Δ | ○ |
|---|---|---|---|
| RF Output (dB) | ≦−1.0 | −0.9 to −0.1 | ≧0.0 |
| Head Clogging | present | present | absent |
| Head abrasion (µm) | ≧4 | 3 to 3.9 | ≦2.9 | weight of the ferromagnetic metal powder, and the abrasives exposure unit having a size of 0.3 µm or more is 3.5 pieces/100 µm² or less, a magnetic recording medium having excellent electromagnetic property and running durability and at the same time, reduced in the head abrasion can be obtained.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer containing a ferromagnetic metal powder and an abrasive dispersed in a binder, wherein said ferromagnetic metal powder comprises iron as a main component and aluminum in an amount of from 1 to 25 atm % based on Fe atom, said abrasive of the magnetic layer has a Moh's hardness equal to or more than 6 and is present in an amount from 4 to 18 parts by weight per 100 parts by weight of the ferromagnetic metal powder, and an abrasive exposure unit which comprises said abrasive and which has a size equal to or more than 0.3 µm observed through an electron microscope on a surface of said magnetic layer is equal to or less than 3.5 pieces/100 µm².

2. The magnetic recording medium as claimed in claim 1, wherein said magnetic layer is a farthest layer on said support.

TABLE 2

Evaluation Results of Tape

| No. | Alumina | Addition Amount (part by weight) | Density of Abrasive Exposure Unit (piece/100 µm²) | RF Output (dB) | Clogging | Head Abrasion (µm/100 hr) | Overall Judgement |
|---|---|---|---|---|---|---|---|
| C1 | HIT 55 powder | 10 | 9.4 | −0.5 | absent | 10.3 | x |
| C2 | Paste A | 10 | 4.1 | 0.0 | absent | 5.1 | x |
| 1 | Paste B | 10 | 2.2 | 0.3 | absent | 2.5 | ○ |
| 2 | Paste C | 10 | 1.3 | 0.4 | absent | 2.0 | ○ |
| C3 | HIT 55 powder | 2 | 2.0 | 0.0 | present | 3.1 | x |
| C4 | Paste C | 2 | 0.3 | 0.6 | present | 0.4 | x |
| 3 | Paste C | 4 | 0.6 | 0.5 | absent | 0.8 | ○ |
| 4 | Paste C | 18 | 3.4 | 0.1 | absent | 3.5 | Δ |
| C5 | Paste C | 21 | 3.8 | −0.4 | absent | 4.3 | x |
| 5 | Paste D | 10 | 0.8 | 0.5 | absent | 1.2 | ○ |
| C6 | Paste E | 10 | 15.3 | −0.6 | absent | 12.4 | x |
| C7 | Paste F | 10 | 6.2 | −0.3 | absent | 8.5 | x |
| C8 | Paste C | 10 | 1.3 | 0.6 | present | 0.4 | x |
| C9 | Paste C | 10 | 1.3 | 0.3 | present | 0.6 | x |

It is seen from the results in Table 2 that when the density of the abrasives exposure unit having a size of 0.3 µm or more on the magnetic layer surface is small and 3.5 pieces/100 µm² or less, the head abrasion is reduced. However, when the addition amount of abrasives is less than 4 wt % to the magnetic powder, the head abrasion is too much reduced, as a result, the cleaning ability is diminished and the clogging is readily generated. Further, when the addition amount of abrasives exceeds 18 wt %, the head abrasion disadvantageously increases.

As described in the foregoing, in a magnetic recording medium comprising non-magnetic support having thereon a magnetic layer containing a ferromagnetic metal powder, abrasives and other additives dispersed in a binder resin, when the ferromagnetic metal powder contains iron as a main component and aluminum in an amount of from 1 to 25 atm % based on the Fe, the magnetic layer contains abrasive particles having a Moh's hardness of 6 or more in an amount of from 4 to 18 parts by weight per 100 parts by 3. The magnetic recording medium as claimed in claim 1, wherein said ferromagnetic metal powder contains Co.

4. The magnetic recording medium as claimed in claim 1, wherein said ferromagnetic metal powder has a coercive force from 1,400 to 2,500 Oe.

5. The magnetic recording medium as claimed in claim 1, wherein said ferromagnetic metal powder has a major axis length from 0.02 to 0.4 µm and has a ratio of major axis length / minor axis length from 2 to 10.

6. The magnetic recording medium as claimed in claim 1, wherein said ferromagnetic metal powder has a crystallite size from 80 to 350 Å.

7. The magnetic recording medium as claimed in claim 1, wherein said ferromagnetic metal powder has a pH from 7 to 10.

8. The magnetic recording medium as claimed in claim 1, wherein said ferromagnetic metal powder comprises aluminum in an amount of from 1 to 20 atm % based on the Fe atom.

9. The magnetic recording medium as claimed in claim 1, wherein said ferromagnetic metal powder comprises aluminum in an amount of from 1 to 10 atm % based on the Fe atom.

10. The magnetic recording medium as claimed in claim 1, wherein said ferromagnetic metal powder has a specific surface area determined by BET method in a range from 30 to 100 m²/g.

11. The magnetic recording medium as claimed in claim 1, wherein said magnetic layer contains said abrasive in an amount from 4 to 16 parts by weight per 100 parts by weight of the ferromagnetic metal powder.

12. The magnetic recording medium as claimed in claim 1, wherein said magnetic layer contains said abrasive in an amount from 4 to 12 parts by weight per 100 parts by weight of the ferromagnetic metal powder.

13. The magnetic recording medium as claimed in claim 1, wherein said abrasive exposure unit is equal to or less than 2.5 pieces/100 µm².

14. The magnetic recording medium as claimed in claim 1, wherein said abrasive exposure unit is equal to or less than 2.0 pieces/100 µm².

15. The magnetic recording medium as claimed in claim 1, wherein said abrasive has a particle size from 0.05 to 0.3 µm.

16. The magnetic recording medium as claimed in claim 1, wherein said abrasive is at least one selected from the group consisting of α-alumina having an α-conversion rate from 90 to 100%, β-alumina, γ-alumina, silicon carbide, chromium oxide, cerium oxide, α-iron oxide, corundum, artificial diamond, silicon nitride, titanium carbide, titanium oxide, silicon dioxide and boron nitride.

17. The magnetic recording medium as claimed in claim 1, wherein said binder comprises a vinyl chloride-resin and a polyurethane resin.

18. The magnetic recording medium as claimed in claim 17, wherein said vinyl chloride resin and said polyurethane resin are present in an amount of from 5 to 30% by weight and 2 to 20% by weight, respectively, based on the ferromagnetic metal powder.

19. The magnetic recording medium as claimed in claim 17, wherein said binder further comprises a polyisocyanate in an amount from 2 to 20% by weight based on the ferromagnetic metal powder.

20. The magnetic recording medium as claimed in claim 17, wherein said polyurethane has a glass transition temperature, breaking extension, breaking stress and yield point in a range from −50° C. to 100° C., 100 to 2,000%, 0.05 to 10 kg/cm² and 0.05 to 10 kg/cm², respectively.

21. The magnetic recording medium as claimed in claim 17, wherein said polyvinyl chloride resin and said polyurethane resin, each has at least one polar group selected from the group consisting of —COOM, —SO₃M, —P=O(OM)₂, —OP=(OM)₂ wherein M represents a hydrogen atom or an alkali metal atom, —OH, —NR₂, —NR₃ wherein R is a hydrocarbon group, an epoxy group, —SH and —CN.

22. The magnetic recording medium as claimed in claim 21, wherein an amount of said polar group in said resin is present in an amount ranging from $1\times10^1$ to $1\times10^8$ mol/g.

23. The magnetic recording medium as claimed in claim 1, wherein said binder is present in an amount ranging from 10 to 30% by weight based on the ferromagnetic metal powder.

24. The magnetic recording medium as claimed in claim 1, wherein said magnetic layer further comprises carbon black.

25. The magnetic recording medium as claimed in claim 1, wherein said magnetic layer further comprises at least one additive selected from the group consisting of lauric acid, myristic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol.

26. The magnetic recording medium as claimed in claim 1, wherein said support has a thickness from 6 to 20 µm.

27. The magnetic recording medium as claimed in claim 1, wherein said magnetic layer has a thickness from 0.05 to 10 µm.

28. The magnetic recording medium as claimed in claim 1, wherein said magnetic recording medium has a back coating layer provided on a side of said support opposite to a side on which said magnetic layer is present.

29. In a magnetic recording system in which a relative speed of a tape to a magnetic head exceeds 6 m/s, wherein said tape comprises the magnetic recording medium as claimed in claim 1.

* * * * *